US011060929B2

(12) United States Patent
Razavidinani et al.

(10) Patent No.: US 11,060,929 B2
(45) Date of Patent: Jul. 13, 2021

(54) PRESSURE SENSOR DIE ATTACH

(71) Applicant: Silicon Microstructures, Inc., Milpitas, CA (US)

(72) Inventors: Keyanoush Razavidinani, Munich (DE); Gertjan van Sprakelaar, Fremont, CA (US); Chris Wagner, San Jose, CA (US)

(73) Assignee: SILICON MICROSTRUCTURES, INC., Milpitas, CA (US)

( * ) Notice: Subject to any disclaimer, the term of this patent is extended or adjusted under 35 U.S.C. 154(b) by 0 days.

(21) Appl. No.: 16/724,166

(22) Filed: Dec. 20, 2019

(65) Prior Publication Data
US 2020/0284668 A1 Sep. 10, 2020

Related U.S. Application Data

(60) Provisional application No. 62/813,661, filed on Mar. 4, 2019.

(51) Int. Cl.
*G01L 1/22* (2006.01)

(52) U.S. Cl.
CPC .......... *G01L 1/2262* (2013.01); *G01L 1/2293* (2013.01)

(58) Field of Classification Search
CPC ..................... G01L 1/2262; G01L 1/2293
USPC ..................................... 73/862.628
See application file for complete search history.

(56) References Cited

U.S. PATENT DOCUMENTS

| 4,943,032 | A  | * | 7/1990  | Zdeblick ............. F15C 3/04 137/116.3 |
| 6,184,561 | B1 |   | 2/2001  | Tanaka et al. |
| 6,351,996 | B1 |   | 3/2002  | Nasiri et al. |
| 2001/0001550 | A1 | * | 5/2001  | Bryzek ............. B81B 3/0072 338/36 |
| 2007/0279832 | A1 | * | 12/2007 | Ray ................. G01P 15/0802 361/271 |
| 2008/0067619 | A1 | * | 3/2008  | Farahani .............. G01L 1/2293 257/417 |
| 2013/0214365 | A1 | * | 8/2013  | Schlarmann .......... G01L 19/147 257/415 |
| 2014/0353772 | A1 | * | 12/2014 | Stermer, Jr. ......... B81C 1/00325 257/415 |
| 2015/0001651 | A1 | * | 1/2015  | Faralli ................ B81C 3/00 257/417 |
| 2015/0090042 | A1 | * | 4/2015  | Vaupel ............... G01L 9/0042 73/725 |
| 2016/0297673 | A1 | * | 10/2016 | Lagouge ............. B81B 7/0006 |
| 2018/0282152 | A1 | * | 10/2018 | Duqi ................. B81B 7/02 |
| 2020/0284632 | A1 | * | 9/2020  | Abed ................. G01F 1/69 |

FOREIGN PATENT DOCUMENTS

DE 102004006199 A1 8/2005

OTHER PUBLICATIONS

Extended European Search Report, European Application No. 20159884. 4-1001, European Filing Date, Jul. 24, 2020.

* cited by examiner

*Primary Examiner* — Max H Noori

(57) ABSTRACT

Pressure sensor systems and methods of assembling pressure sensor systems that reduce the need for accurate placement of a pressure sensor die in a pressure sensor package, reduce leakage in pressure sensor systems, and provides a consistent attachment of a pressure sensor die to a package.

16 Claims, 6 Drawing Sheets

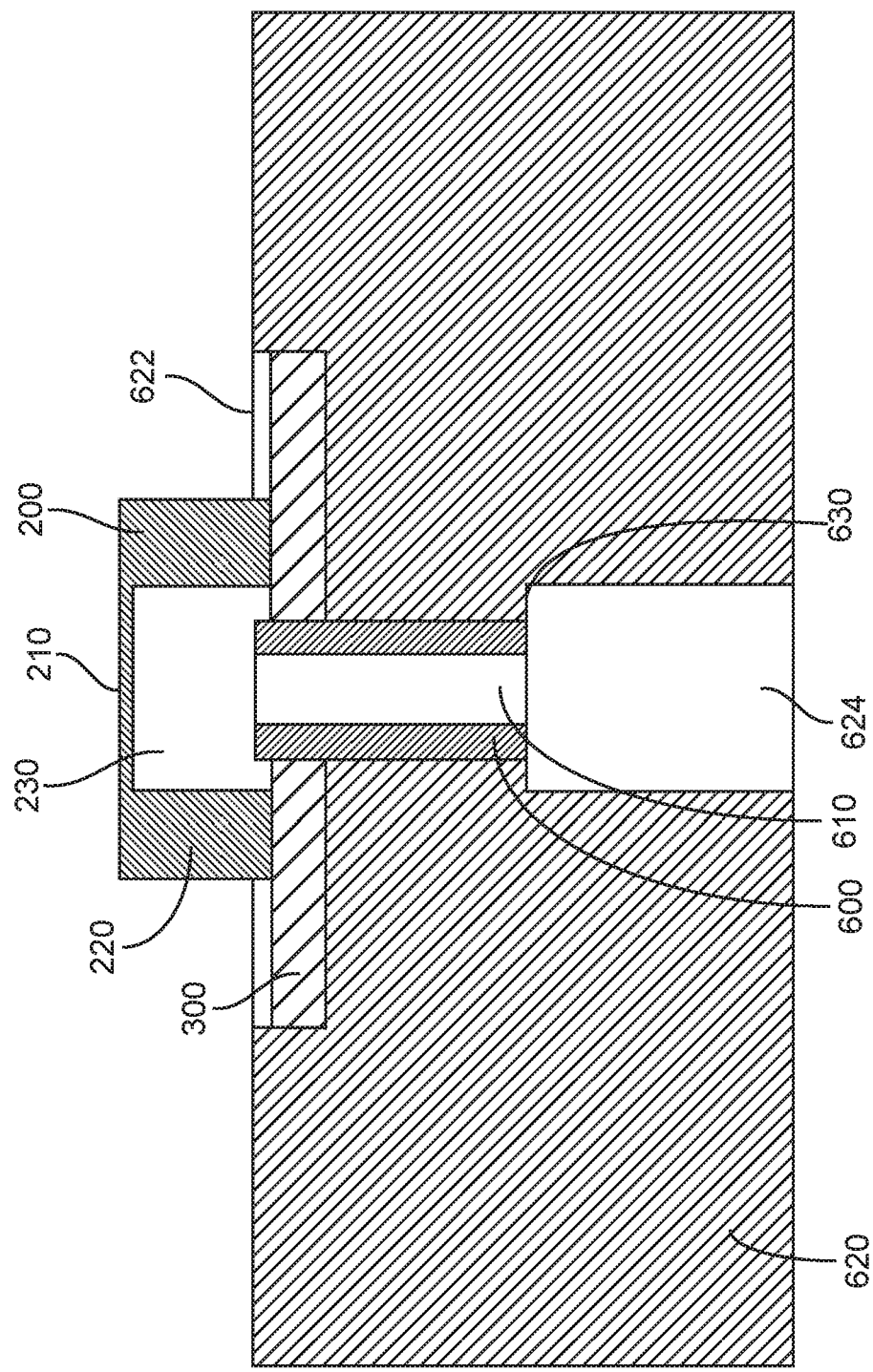

PRESSURE SENSOR DIE ATTACH

CROSS-REFERENCES TO RELATED APPLICATIONS

This application claims priority to U.S. provisional application No. 62/813,661, filed Mar. 4, 2019, which is incorporated by reference.

BACKGROUND

Pressure sensor systems have become ubiquitous the past few years as they have found their way into many types of products. Utilized in automotive, industrial, consumer, and medical products, the demand for pressure sensor systems has skyrocketed and shows no signs of abating.

Pressure sensor systems can include a pressure sensor chip or die as well as other components. A pressure sensor die can typically include a diaphragm or membrane. This membrane can be formed by creating a Wheatstone bridge in a silicon wafer, then etching away the silicon from the opposite surface until a thin layer of silicon is formed beneath the Wheatstone bridge. The resulting membrane can be surrounded by a thicker, non-etched silicon wafer portion or frame, where the membrane and frame form a cavity. When a pressure sensor die in a pressure sensor systems experiences a pressure, the membrane can respond by changing shape. This change in shape can cause one or more characteristics of electronic components on the membrane to change. These changing characteristics can be measured, and from these measurements, the magnitude of the pressure can be determined.

Difficulties can arise in manufacturing pressure sensor systems. Pressure sensor systems can be formed by attaching pressure sensor dice in pressure sensor packages. These packages can have a passage that needs to be aligned with a cavity of a pressure die during the attachment process. This alignment can require the use of expensive die placement equipment.

Variations in the attachment area between a pressure sensor die and pressure sensor package can lead to errors in pressure readings measured by the pressure sensor system. Worst case, these variations can cause leakage in the attachment area. Any leakage paths through the attachment area can render the pressure sensor system nonfunctional. Also, these variations can lead to differences in a height of the pressure sensor die relative to the package, which can cause packaging problems that can lead to inconsistent performance.

Thus, what is needed are pressure sensor systems and methods of assembling pressure sensor systems that reduce the need for accurate placement of a pressure sensor die in a package, reduce leakage in pressure sensor systems, and provides a consistent attachment of a pressure sensor die to a package.

SUMMARY

Accordingly, embodiments of the present invention can provide pressure sensor systems and methods of assembling pressure sensor systems that reduce the need for accurate placement of a pressure sensor die in a package, reduce leakage in pressure sensor systems, and provides a consistent attachment of a pressure sensor die to a package.

An illustrative embodiment of the present invention can provide methods of assembling pressure sensor systems that do not rely on the use of highly accurate placement systems. These and other embodiments of the present invention can provide a package or other substrate having a trench. A first amount of a first material in a liquefied form can be deposited in the trench. The first material can be cured such that it forms a rubbery or compliant layer. A second amount of a second material can be deposited in the trench over the first material. The second material can be at least somewhat liquefied. A pressure sensor die having a membrane and a frame can be positioned such that the frame is in the trench. Pressure can be applied to the pressure sensor die to hold it in place, thought in these and other embodiments of the present invention, gravity can be sufficient for this task. The second material can be cured to hold the pressure sensor die in place in the pressure sensor package. The first material can be located in the trench between a bottom of the frame and the bottom of the trench. The second material can surround a bottom portion of the frame.

In these and other embodiments of the present invention, the package can be formed of plastic, Laser Direct Structuring (LDS) materials, acrylic, or other material or combination of materials. The package can be formed by formed by transfer or injection molding, with our without inserts, 3-D printing, or other technique. In these and other embodiments of the present invention, a subassembly, silicon wafer, printed circuit board, or other structure can be used in place of a package. These can be formed of ceramic, a printed circuit board material such as FR4, silicon, or other material or combination of materials.

The first material can be the same as the second material, though the first material and the second material can be different materials. The first and second materials can be room-temperature vulcanizing sealants (RTV), silicone, fluorosilicone, gel, epoxy, urethane, polymer based materials, or other materials or combination thereof. Various additives can be mixed with either or both the first and second materials before they are applied in the trench. For example, coloring agents, such as dyes or pigments can be added. These coloring agents can provide a desirable level of opacity or other optical property. Hardeners, accelerants or solvents can be mixed with either or both the first and second materials. Other materials to adjust the curing rate, curing temperature, or other aspects can also be added to either or both materials. Conductive materials can be added, for example to provide shielding or a ground path to a frame of the pressure sensor die.

An illustrative embodiment of the present invention can provide pressure sensor systems having reduced leakage and a consistent attachment of a pressure sensor die to a package. These and other embodiments of the present invention can provide a pressure sensor system having a pressure sensor die that includes a membrane supported by a frame. The pressure sensor system can also include a package having a top surface and a trench located in the top surface. A bottom portion of the frame can be located in the trench. A first material can be located in the trench, between a bottom of the frame and a bottom surface of the trench. A second material can be located in the trench and over the first material. The second material can surround the bottom portion of the frame. As before, the first material can be the same as the second material, though the first material and the second material can be different materials. The use of dual layers, particularly the second layer that can surround a bottom portion of a frame, can reduce leakage through the pressure sensor system. This arrangement can also balance forces applied by the first and second material to the frame. Through consistent application of amounts of the first material and the second material, a consistent attachment of a pressure sensor die to a package can be achieved.

In these and other embodiments of the present invention, different types of pressure sensor systems can be provided. For example, the pressure sensor package can include a passage that forms an opening that is surrounded by the frame in order to form a gauge pressure sensor system or a differential pressure sensor system. The passage can be blocked or absent in an absolute pressure sensor system.

In these and other embodiments of the present invention, the package can be formed in various ways. For example, a tube can be overmolded to form a substrate, where the tube forms a passage through the substrate. A recess can be formed in a top surface of the substrate such that a top portion of the tube is exposed in the recess. A pressure sensor die can be placed in the recess as outlined above such that the exposed portion of the tube is located in a cavity of the pressure sensor die.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 6 illustrates a portion of a pressure sensor system according to an embodiment of the present invention.

DESCRIPTION OF ILLUSTRATIVE EMBODIMENTS

Figure 1:
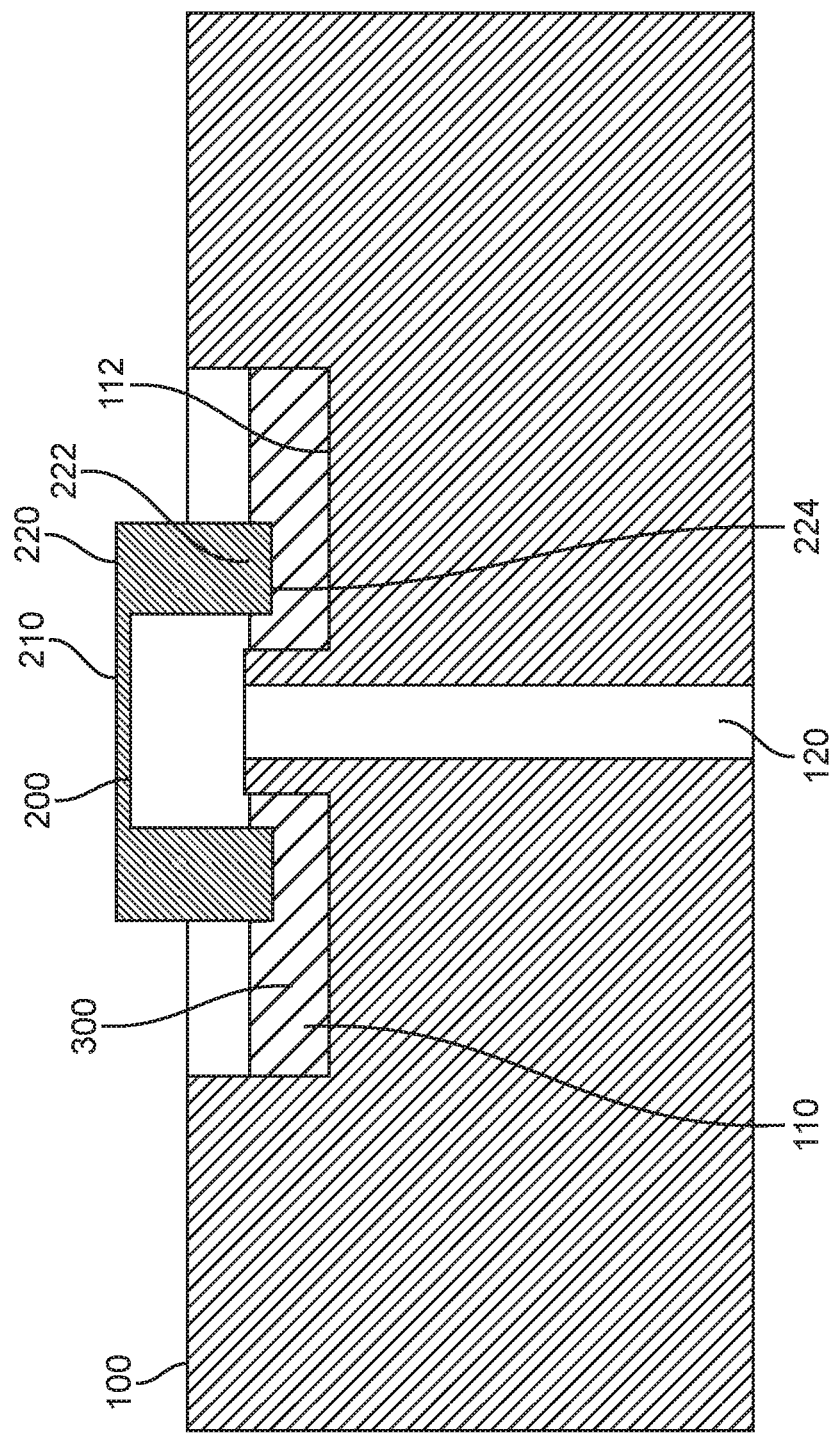
FIG. 1 illustrates a cross-section of a pressure sensor system according to an embodiment of the present invention.

FIG. 1 illustrates a cross-section of a pressure sensor system according to an embodiment of the present invention. This figure, as with the other included figures, is shown for illustrative purposes and does not limit either the possible embodiments of the present invention or the claims.

This pressure sensor system can include pressure sensor package 100. Pressure sensor package (or substrate) 100 can include a trench 110 having a bottom 112. One or more layers of one or more materials can form layers 300, which can be located in trench 110. Pressure sensor die 200 can include membrane 210 and frame 220. One or more components, such as resistors or transistors (not shown), can be located on or near membrane 210. For example, resistors for a Wheatstone bridge can be formed on or near membrane 210. A bottom portion 222 of frame 220 can be surrounded by one or more layers 300. One or more layers 300 can be located between a bottom 224 of frame 220 and a bottom 112 of trench 110.

In these and other embodiments of the present invention, pressure sensor package 100 can be formed of plastic, Laser Direct Structuring (LDS) materials, acrylic, or other material or combination of materials. Pressure sensor package 100 can be formed by formed by transfer or injection molding, with our without inserts, 3-D printing, or other technique. In these and other embodiments of the present invention, a subassembly, silicon wafer, printed circuit board, or other structure can be used in place of pressure sensor package 100. These can be formed of ceramic, printed circuit board material such as FR4, silicon, or other material or combination of materials.

These and other embodiments of the present invention can be used to form different types of pressure sensor systems. For example, passage 120 can be included to form a gauge or differential pressure system. Passage 120 can be blocked or absent in order to form an absolute pressure sensor.

Figure 2:
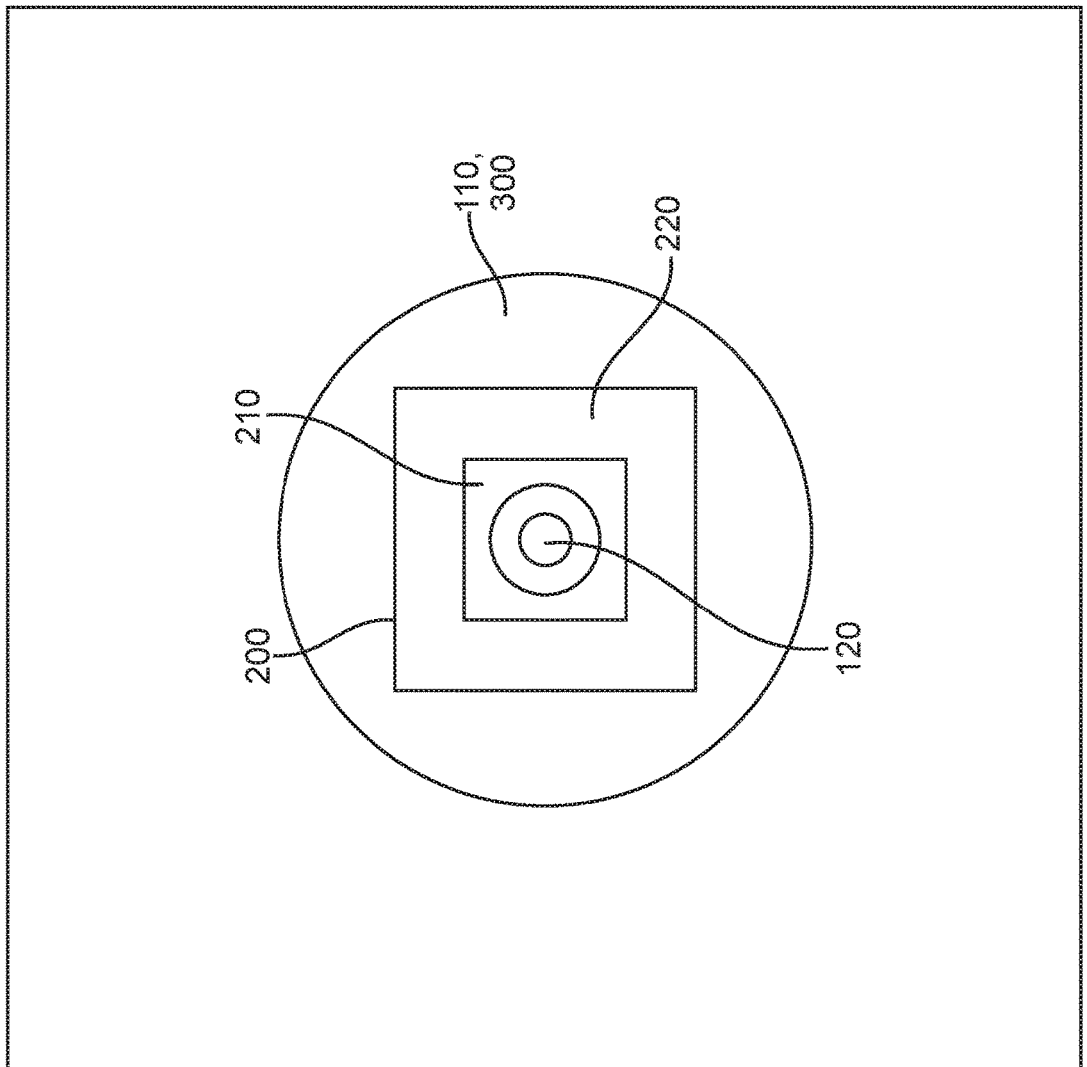
FIG. 2 is a top view of a pressure sensor system according to an embodiment of the present invention.

FIG. 2 is a top view of a pressure sensor system according to an embodiment of the present invention. In this example, pressure sensor package 100 can include trench 110. Pressure sensor die 200 can have a frame 220 that is located in trench 110. As before, one or more layers 300 can be located in trench 110. Passage 120 can form an opening below membrane 210 of pressure sensor die 200. Frame 220 can surround the opening formed by passage 120 on its lateral sides.

Figure 3:
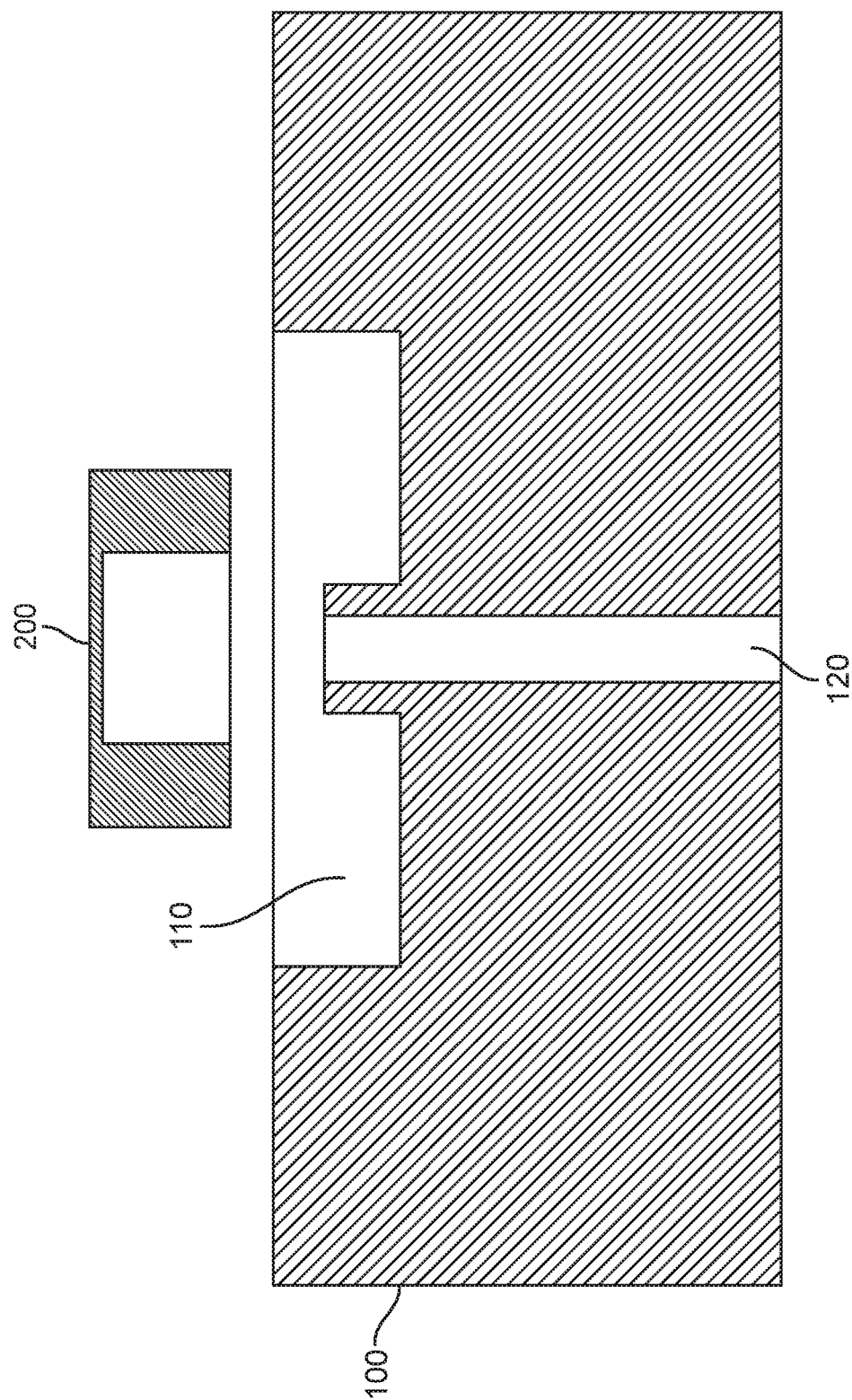
FIGS. 3-5 illustrate a method of manufacturing a pressure sensor system according to an embodiment of the present invention.
Figure 4:
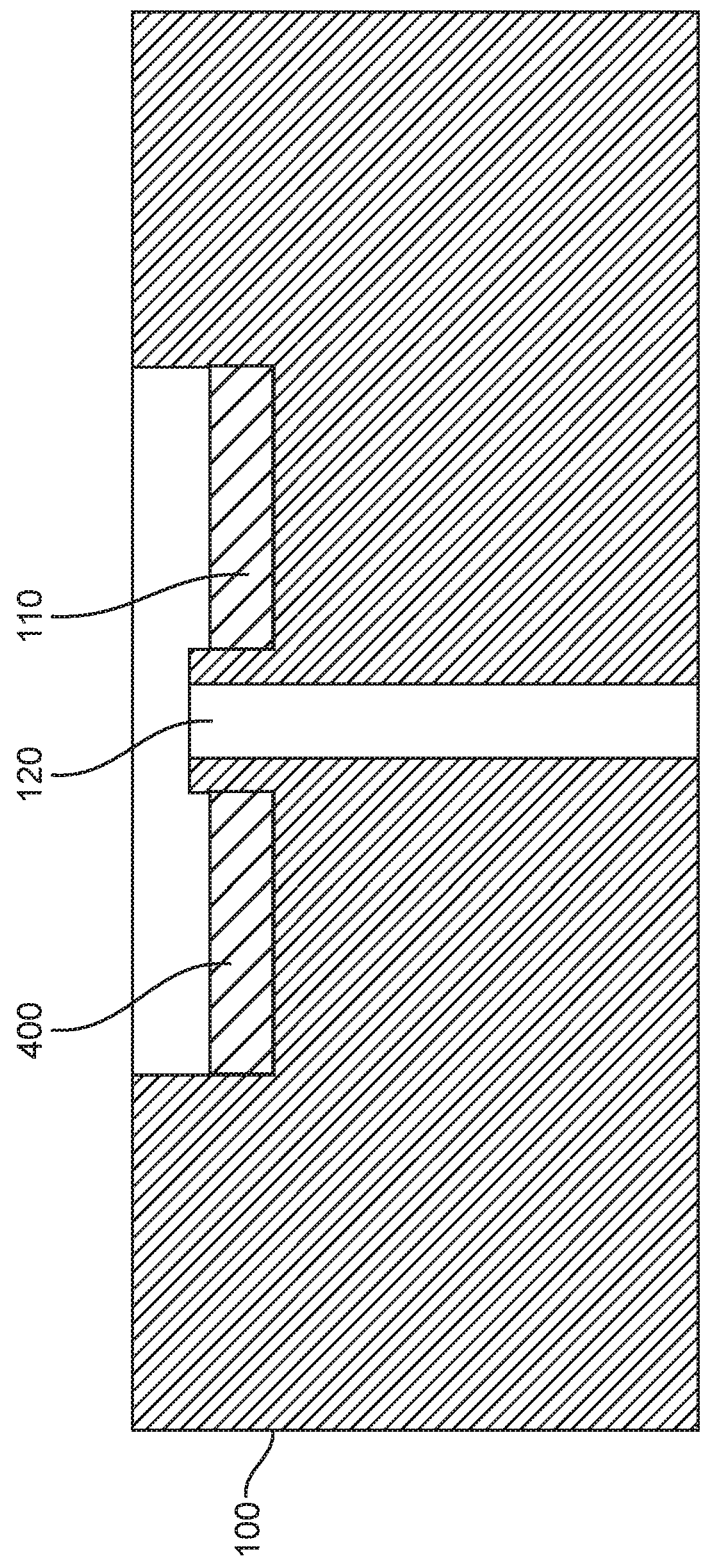
Figure 5:
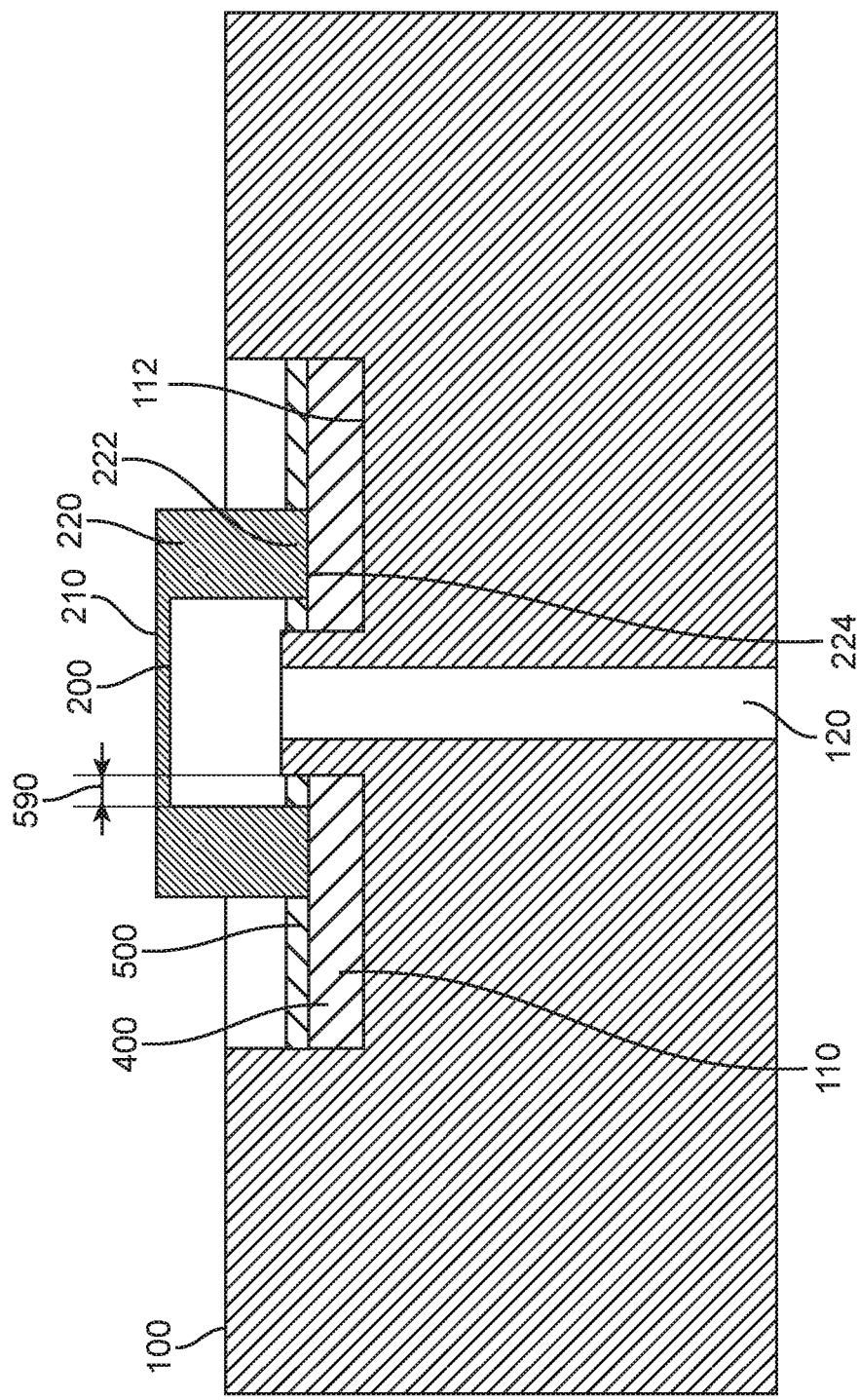

FIGS. 3-5 illustrate a method of manufacturing a pressure sensor system according to an embodiment of the present invention. In FIG. 3, pressure sensor package 100 and pressure sensor die 200 can be provided. Pressure sensor package 100 can include a passage 120 and trench 110.

In FIG. 4, a first amount of the first material 400 can be deposited, applied, or otherwise placed in trench 110. First material 400 can be a room-temperature vulcanizing sealant (RTV), silicone, fluorosilicone, gel, epoxy, urethane, polymer based material, or other material or combination thereof. Various additives can be mixed with first material 400 before it is applied in the trench. For example, coloring agents, such as dyes or pigments can be added. These coloring agents can provide a desirable level of opacity or other optical property. Hardeners, accelerants or solvents can be mixed with first material 400. Other materials to adjust the curing rate, curing temperature, or other aspects can also be added to first material 400. Conductive materials can be added, for example to provide shielding or a ground path to a frame of the pressure sensor die. The first material 400 can then be cured. In these and other embodiments of the present invention, the first amount of first material 400 can be accurately provided such that a resulting height of a pressure sensor die 200 relative to pressure sensor package 100 can be consistent.

In FIG. 5, a second amount of a second material 500 can be deposited, applied, or otherwise placed in trench 110 of pressure sensor package 100 over first material 400. Second material 500 can be a room-temperature vulcanizing sealant (RTV), silicone, fluorosilicone, gel, epoxy, urethane, polymer based material, or other material or combination thereof. Various additives can be mixed with second material 500 before it is applied in the trench. For example, coloring agents, such as dyes or pigments can be added. These coloring agents can provide a desirable level of opacity or other optical property. Hardeners, accelerants or solvents can be mixed with second material 500. Other materials to adjust the curing rate, curing temperature, or other aspects can also be added to second material 500. Conductive materials can be added, for example to provide shielding or a ground path to a frame of the pressure sensor die. While the second amount of second material 500 is at least somewhat liquefied, pressure sensor die 200 can be placed in trench 110. Specifically, frame 220 can be placed in trench 110 such that passage 120 has an opening below membrane 210. A force can be applied to the pressure sensor die 200 to hold pressure sensor die 200 in place. In these and other embodiments of the present invention, gravity can be sufficient for this task. Second material 500 can be cured thereby holding pressure sensor die 200 in place.

In this arrangement, bottom portion 222 of frame 220 of pressure sensor die 200 can be surrounded on vertical sides by second material 500. First material 400 can be located between a bottom 224 of frame 220 and a bottom 112 of trench 110. This can help to reduce leakage paths through the pressure sensor system.

In this example, the pressure sensor system can remain functional even when pressure sensor die 200 is misaligned by a distance 590. This is true for misplacement in both the X and Y directions. This error tolerance can allow be pressure sensor system to be manufactured without the need of expensive placement equipment.

In these and other embodiments of the present invention, the package can be formed in various ways. An example is shown in the following figure.

FIG. 6 illustrates a portion of a pressure sensor system according to an embodiment of the present invention. In this example, tube 600 having central passage 610 can be provided. Substrate 620 can be formed around tube 600. Substrate 620 can include a trench or recess 622 in a top side and an opening 624 in a bottom side. A top portion of tube 600 can be exposed in trench or recess 622. Central passage 610 in tube 600 can provide a pathway for gas or other fluids from opening 624 to backside cavity 230 in pressure sensor die 200. A bottom portion of tube 600 can include a flange at position 630 to further secure tube 600 in place in substrate 620.

Pressure sensor die 200 can include frame 220 that can be located in trench or recess 622 of substrate 620. Pressure sensor die 200 can further include membrane 210. Membrane 210 and frame 220 can define a backside cavity 230 in pressure sensor die 200.

As before, one or more materials, such as first material 400 and second material 500 (shown above in FIGS. 4 and 5) can be used as an adhesive layer 300 to secure pressure sensor die 200 in place in trench or recess 622 of substrate 620.

In this configuration, pressure sensor die 200 can measure a differential pressure between a top side of membrane 210 of pressure sensor die 200 and opening 624 in substrate 620.

In this example, the overmolded substrate 620 can be formed of plastic, LDS, or other material or combination of materials. Tube 600 can be formed of metal, plastic, ceramic, or other material or combination of materials. Overmolded substrate 620 can be formed by formed by transfer or injection molding, with our without inserts, 3-D printing, or other technique. In these and other embodiments of the present invention, a subassembly, silicon wafer, printed circuit board, or other structure can be used in place of overmolded substrate 620. These can be formed of ceramic, printed circuit board material such as FR4, silicon, or other material or combination of materials. For example, tube 600 can be inserted through an opening in a printed circuit board and fixed in place by soldering, applying an adhesive, or other method.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A pressure sensor system comprising:
   a pressure sensor die having a membrane supported by a frame;
   a package having a top surface and a trench located in the top surface, wherein a portion of the frame is located in the trench; and
   a first material located in the trench, wherein the first material is located between a bottom of the frame and a bottom surface of the trench, and wherein the first material surrounds a bottom portion of the frame.

2. The pressure sensor system of claim 1 further comprising a passage through the package and forming an opening under the membrane.

3. The pressure sensor system of claim 2 wherein the first material is an adhesive.

4. The pressure sensor system of claim 2 wherein the first material is silicone.

5. A pressure sensor system comprising:
   a pressure sensor die having a membrane supported by a frame;
   a package having a top surface and a trench located in the top surface, wherein a portion of the frame is located in the trench;
   a first material located in the trench, wherein the first material is located between a bottom of the frame and a bottom surface of the trench; and
   a second material located in the trench and on the first material, wherein the second material surrounds a bottom portion of the frame.

6. The pressure sensor system of claim 5 further comprising a passage through the package and forming an opening under the membrane.

7. The pressure sensor system of claim 6 wherein the first material and the second material are adhesives.

8. The pressure sensor system of claim 7 wherein the first material and the second material comprise the same material.

9. The pressure sensor system of claim 6 wherein the second material is silicone.

10. A pressure sensor system comprising:
    a tube having a center passage;
    a substrate formed around the tube, the substrate having a trench in a top side, such that a top portion of the tube is exposed in the trench and the center passage of the tube forms at least a portion of a passage through the substrate;
    a pressure sensor die having a membrane supported by a frame, wherein the membrane and the frame define a backside cavity in the pressure sensor die, and wherein a portion of the frame is located in the trench such that the top portion of the tube is located in the backside cavity of the pressure sensor die;
    a first material located in the trench, wherein the first material is located between a bottom of the frame and a bottom surface of the trench; and
    a second material located in the trench and on the first material, wherein the second material surrounds a bottom portion of the frame.

11. The pressure sensor system of claim 10 wherein the substrate is formed by injection molding.

12. The pressure sensor system of claim 11 wherein the first material and the second material are one or more adhesives.

13. The pressure sensor system of claim 11 wherein the first material is silicone.

14. The pressure sensor system of claim 11 wherein the second material is silicone.

15. The pressure sensor system of claim 1 wherein the membrane and the frame define a backside cavity in the pressure sensor die.

16. The pressure sensor system of claim 15 further comprising a passage through the package and forming an opening under the membrane in the backside cavity.

* * * * *